United States Patent
Denton et al.

(10) Patent No.: US 7,297,267 B2
(45) Date of Patent: Nov. 20, 2007

(54) OIL-SORBING FILTER ELEMENT

(75) Inventors: Donald R Denton, Henryetta, OK (US); Douglas E. Herrick, Henryetta, OK (US); Geary Lane, Dewar, OK (US); Kirby S. Mohr, Jenks, OK (US)

(73) Assignee: Parker-Hannifin Corporation, Cleveland, OH (US)

( * ) Notice: Subject to any disclaimer, the term of this patent is extended or adjusted under 35 U.S.C. 154(b) by 169 days.

(21) Appl. No.: 10/775,676

(22) Filed: Feb. 10, 2004

(65) Prior Publication Data

US 2004/0178150 A1    Sep. 16, 2004

Related U.S. Application Data

(60) Provisional application No. 60/454,082, filed on Mar. 11, 2003.

(51) Int. Cl.
*B01D 15/00* (2006.01)

(52) U.S. Cl. .............. 210/315; 210/317; 210/502.1

(58) Field of Classification Search .......... 210/502.1, 210/289, 315, 317, 693
See application file for complete search history.

(56) References Cited

U.S. PATENT DOCUMENTS

| 3,847,821 A | 11/1974 | Krueger ............. 210/488 |
| 3,913,513 A * | 10/1975 | Pedone .............. 114/183 R |
| 4,031,839 A | 6/1977 | Pedone ................ 114/382 |
| 4,058,463 A | 11/1977 | Bartik ................. 210/317 |
| 4,066,545 A | 1/1978 | Walters et al. ........ 210/739 |
| 4,359,386 A | 11/1982 | Crema ................. 210/336 |
| 5,092,911 A | 3/1992 | Williams et al. ........ 95/117 |
| 5,122,270 A * | 6/1992 | Ruger et al. .......... 210/282 |
| 5,445,734 A | 8/1995 | Chen ................... 210/232 |
| 5,767,060 A * | 6/1998 | Hanrahan ............ 210/502.1 |
| 5,863,440 A * | 1/1999 | Rink et al. ............ 210/693 |
| 5,919,362 A | 7/1999 | Barnes et al. .......... 210/232 |
| 6,056,881 A | 5/2000 | Miller et al. .......... 210/702 |
| 6,143,172 A | 11/2000 | Rink et al. ............ 210/237 |
| 6,200,484 B1 | 3/2001 | McInnis ............... 210/693 |
| 6,344,519 B1 | 2/2002 | Rink et al. ............. 525/97 |
| 6,475,393 B2 | 11/2002 | Alper ................. 210/680 |
| 6,485,639 B1 | 11/2002 | Gannon et al. ......... 210/164 |
| 6,503,390 B1 | 1/2003 | Gannon ............... 210/164 |
| 6,572,762 B2 * | 6/2003 | Maxwell et al. ......... 210/90 |
| 6,712,976 B2 * | 3/2004 | Manzone .............. 210/668 |
| 2001/0047967 A1 * | 12/2001 | Williamson et al. ...... 210/799 |
| 2002/0195384 A1 | 12/2002 | Rohrbach et al. ....... 210/266 |

FOREIGN PATENT DOCUMENTS

WO      WO 02/062445      8/2002

OTHER PUBLICATIONS

Powerboat Reports, dated Mar. 2002, pp. 20-22.
EC Knowledge Center—Block Copolymers—In the U.S. Adhesives Industry published by ChemQuest, dated Nov. 1, 2001.

(Continued)

*Primary Examiner*—Matthew O. Savage
(74) *Attorney, Agent, or Firm*—John A. Molnar, Jr.

(57) ABSTRACT

An oil-sorbing filter element for removing oil from an aqueous flow such as the bilge water of a watercraft. The element includes a first stage which is formed of a consolidated permeable mass of a oleophilic polymeric material such as styrenic mid-block copolymer.

15 Claims, 2 Drawing Sheets

OTHER PUBLICATIONS

Kraton Polymers Material Safety Data Sheet, Rev. 02, dated Feb. 14, 2003. Six sheets regarding Kraton Polymers. Applicants request the Examiner to consider this reference as prior art under 102(a), however, Applicants respectfully reserve the right to supplement this information Disclosure Statement and take a contrary position should it be necessary.

* cited by examiner

OIL-SORBING FILTER ELEMENT

CROSS-REFERENCE TO RELATED CASES

The present application claims the benefit of the filing date of U.S. Provisional Application Ser. No. 60/454,082; filed Mar. 11, 2003, the disclosure of which is expressly incorporated herein by reference.

BACKGROUND OF THE INVENTION

The present invention relates broadly to the removal of oil, fuels, and other hydrocarbons or solvents from water, which may be fresh, salt, brackish, or other, and more particularly to an oil-sorbing filter cartridge or other type element such as for a bilge water treatment system for a watercraft.

Various systems are known for removing at least some of the oil and other hydrocarbons, which often is contained in bilge water before the water is pumped overboard or otherwise discharged. Such systems are described, for example, in commonly-assigned WO 02/062445, and in U.S. Pat. Nos. 4,031,839; 4,066,545; 4,058,463; and 6,056,881. Many of these systems utilize a cartridge-type or other filter element having an oil-sorbing or other medium for removing the oil from the discharge stream. Such filters and media therefor, as well as other filters and media for separating oil from water, may be further described in U.S. Pat. Nos. 3,847,821; 4,031,839; 4,359,386; 5,092,911; 6,143,172; 6,200,484; 6,344,519; 6,475,393; 6,485,639; and 6,503,390, in U.S. Publication No. 2002/0195384, and in the publication "Powerboat Reports," March 2002, pp. 20-22.

Heretofore, many of such filters employed a fibrous or loose fill adsorbent medium such as polypropylene or other polymer, or activated carbon. It has been observed, however, that media of such type may not always perform optimally due to settling of the medium within the canister or other housing within which it may be contained, or due to channeling caused by the flow of the treatment stream. In either case, the service life of the filter may be prematurely shortened as the water being treated may bypass a majority of the media which may still be fresh. Accordingly, it is believed there remains a need for an improved oil-sorbing filter cartridge for use in bilge water treatment systems and in other fields similarly concerned such as for the treatment of waste streams from industrial processes.

BROAD STATEMENT OF THE INVENTION

The present invention is directed to an oil-sorbing filter cartridge or other element for removing oil, hydrocarbons, solvents, and other sorbable contaminants from an aqueous stream such as the discharge of a bilge water treatment system. The cartridge, which may be single, dual, or multi-stage, employs in a least one of the stages a unique medium. Such medium may comprise an oleophilic polymeric material which is molded, sintered, extruded, or otherwise consolidated into a permeable layer or other mass which may have a specified density of between about 0.2-0.8 g/cm$^3$. The oleophilic polymeric material may be, broadly, an oil-absorbing thermoplastic elastomer and, as such, may be generally flexible and resilient.

More particularly, the material, which may also be a blend, alloy, mixture, copolymer, or other combination of two or more materials, may be a styrenic mid-block (A-B-A) copolymer, with the mid-block being a saturated elastomer, e.g., styrene-ethylene/butylene-styrene (SEBS) or styrene-ethylene/propylene-styrene (SEPS), or an unsaturated elastomer, e.g., styrene-butadiene-styrene (SBS) or styrene-isoprene-styrene (SIS). The material alternatively may be an oil-adsorbing polymer or copolymer such as polypropylene, and, in whatever its sorptive form, may also be filled or otherwise blended with another oil-sorbing material such as an activated carbon.

In an illustrated embodiment, the medium is molded into a generally cylindrical, radial-flow element, which may be received within a canister or other housing of a filter for installation within, for example, a line of a bilge water treatment system or other system. Depending upon the direction of flow within the filter, such as from out to in, the element may be arranged as an inner or innermost stage which is surrounded by an outer or outermost stage of a medium which may be formed of the same or different material as the medium of the inner stage. The outer stage medium may be granular or other particulate fill, or, alternatively, a woven, nonwoven, e.g., wound, spunbonded, or melt-blown, rolled, or otherwise formed fiber body.

The present invention, accordingly, comprises the composition, fabrication, and/or construction, combination of elements, and/or arrangement of parts and steps, which are exemplified in the detailed disclosure to follow. Advantages of the present invention include an oil-sorbing filter element, which exhibits superior oil separation performance while affording a long service life. Additional advantages include an economical filter element construction, which may be provided in a cartridge form for use in conventional canister and other housing assemblies. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
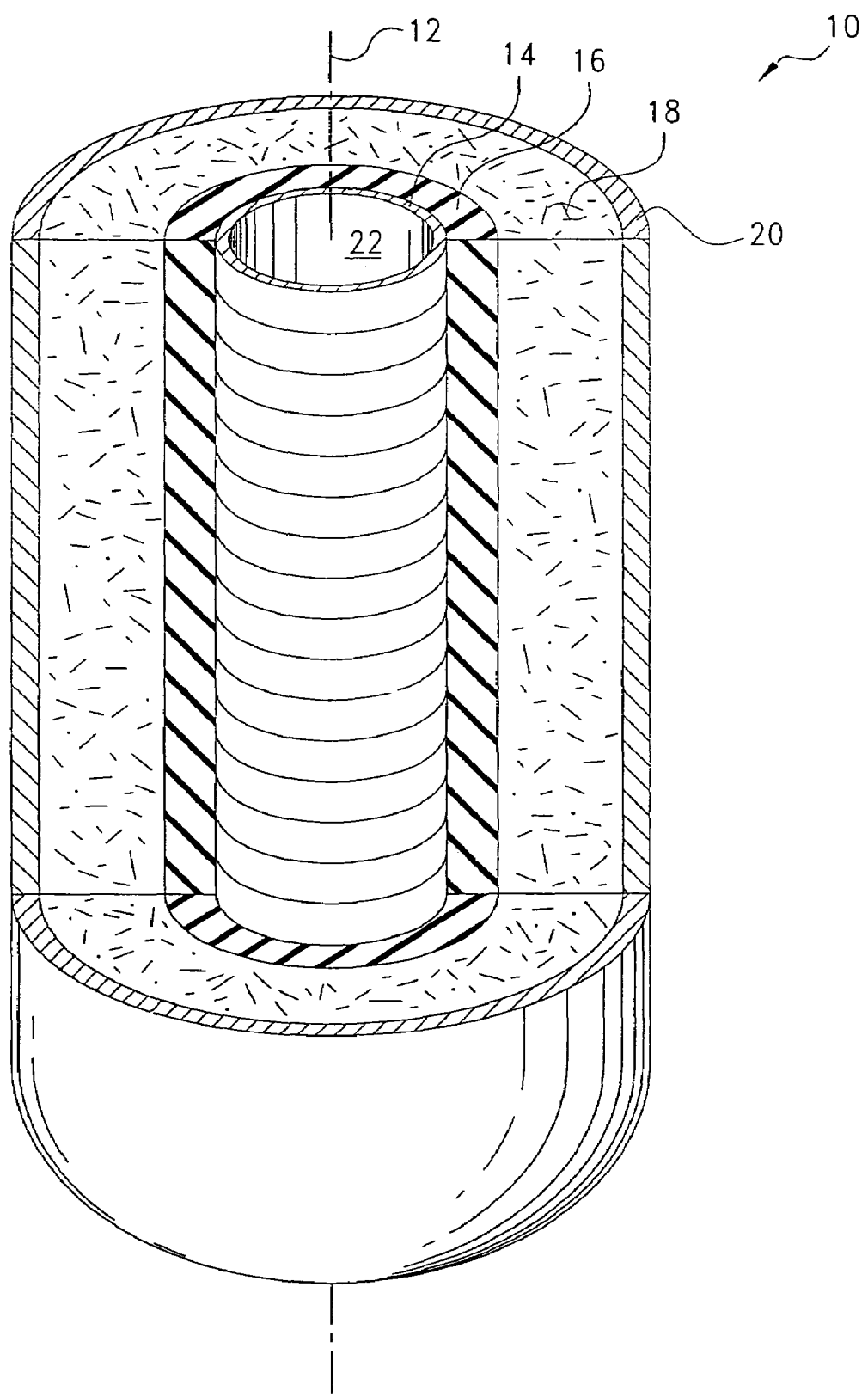
FIG. 1 is an isometric, partially cross-sectional view of a representative oil-sorbing filter cartridge in accordance with the present invention.

The drawings will be described further in connection with the following Detailed Description of the Invention

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," "top" and "bottom," and "right" and "left" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "vertical" and "axial" or "horizontal" referring, respectively, to directions, axes, or planes perpendicular and parallel to the longitudinal central axis of the referenced element, and the terms "upstream" and "downstream" referring, respectively, to fluid state before and after flow through a filter or other element of concern. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows or underscores.

For the illustrative purposes of the discourse to follow, the oil-sorbing filter element of the invention herein involved is described in connection with its configuration for use as a 2-stage cartridge within a canister or other housing of a radial-flow-type filter, such as for installation within a line of bilge water treatment system. It will be appreciated, however, that aspects of the present invention, whether in a single, dual, or multi-stage embodiment, may find utility in other filter types such as in-line, and in other applications such as wastewater treatments systems for industrial process streams. Use within those such other filter types and applications therefore should be considered to be expressly within the scope of the present invention.

As used herein, the terms "oleophilic" and "oil-sorbing" should be understood to mean having an affinity to or sorbing, as the case may be, oils and, broadly, hydrocarbons and other sorbable fluids, such oils, hydrocarbons, and fluids including, but not limited to, diesel fuel, jet fuel, gasoline, hydraulic oil, lube oil, grease, solvents, and the like. Also, the term "copolymer" should be understood to include terpolymer and higher copolymers.

Figure 2:
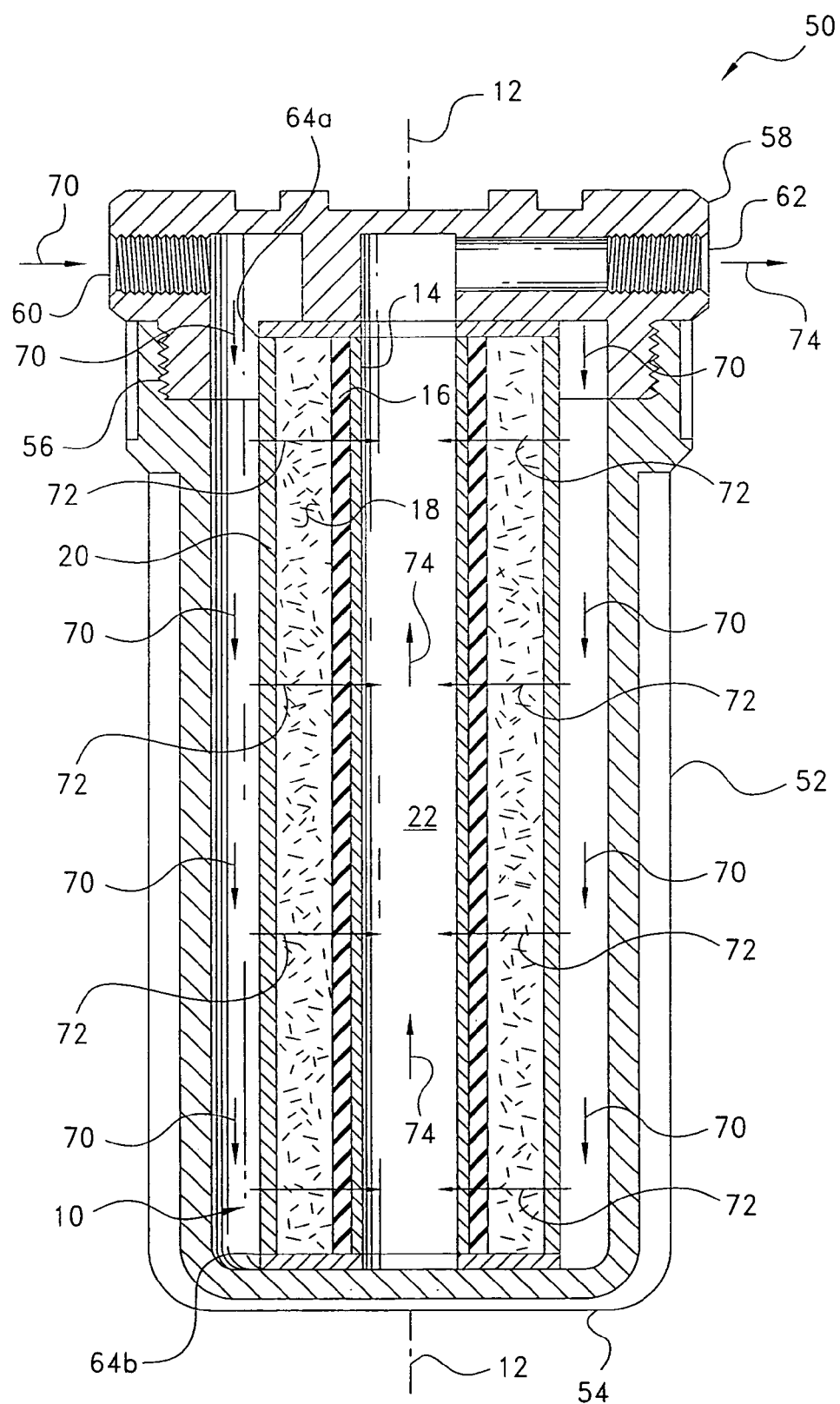
FIG. 2 is a longitudinal cross-sectional view of a filter assembly incorporating an oil-sorbing filter element in accordance with the present invention.

Referring then to the figures wherein corresponding reference characters are used to designate corresponding elements throughout the several views with equivalent elements being referenced with prime or sequential alphanumeric designations, a representative oil-sorbing filter cartridge or other element, such as may be received within a canister or other housing (see FIG. 2), in accordance with the present invention is shown generally at 10 in the cross-sectional view of FIG. 1. In basic construction, cartridge 10 is generally cylindrical or otherwise elongate in extending axially along a central longitudinal axis, 12, and includes, in the illustrative 2-stage embodiment shown, a tubular or otherwise generally annular center or inner core, 14, a tubular or otherwise generally annular first stage 16 which radially, i.e., concentrically or otherwise, surrounds the core, an optional second stage, 18, which radially surrounds the first stage 16, and an outer covering, 20, which radially surrounds the second stage. It should be noted that the terms "first" and "second" are used in reference to FIG. 1 to denote location relative to axis 12, but not, necessarily, to order relative to fluid flow. In this regard, in the illustrated embodiment 10 of FIG. 1, and as depending upon the direction of the radial flow through the element 10, each of the stages 16 and 18 may be either an inner or innermost stage, or an outer or outermost stage of the cartridge, with the flow passing from one of the stages to the other, and through any intermediate stages.

Core 14 surrounds an internal passageway, 22, of the cartridge 10, and may be provided as a perforate, extruded, molded, wound, machined, or otherwise formed tube for the radial flow of the bilge water or other fluid therethrough and into or, as the case may be, out of the passageway 22. The tube forming core 14 may be formed of a plastic or plastic composite, but also may be formed of a metal, which may be a screen or mesh, as the application may require. Depending upon the flow direction through the cartridge 10, i.e., radially from in to out, or from out to in, core 14 may function either as a fluid entrance or discharge tube.

First stage 16 may be molded, sintered, extruded, or otherwise consolidated, such as to a density of between about 0.2-0.8 g/cm$^3$, into a unitary tubular layer or other mass of a first medium which comprises an oleophilic polymeric material. By the control, for example, of the compression ratio, such as a ratio of 2 to 1 from a free granular state in the case of a sintered material, or of temperature, such as heating to a relatively low temperature in the case of an extruded material, the tubular layer or other form of the consolidated material of the first medium may be made porous so as to be fluid, and typically liquid, permeable. In this regard, such form should exhibit a porosity both on its surface and through the depth thereof so as to allow the bilge water or other flow to be treated to pass from one side of the stage to the other.

The material forming the medium of the first stage 16 may be oil-absorbing and/or oil-adsorbing, and may be a blend, alloy, mixture, copolymer, or other combination of one or more oil-absorbing materials, one or more oil-adsorbing materials, one or more oil-adsorbing materials and one or more oil-absorbing materials, and any of the same with one or more other components, such as binders, fillers, or additives which may be active or inactive. In the case of an oil absorbing polymeric material, such material may be thermoplastic elastomer and, as such, may be melt-processible and exhibit rubber-like properties of compliancy, resiliency or compression deflection, low compression set, flexibility, and/or an ability to recover after deformation. The tubular or other form of stage 16 itself also may exhibit such properties, but as may depend, particularly, upon any other components which may be included in the formulation of the medium. Such form of the medium of the first stage 16 may be sleeved or otherwise fitted over the core 14 and elastically, i.e., compressively, interferingly, or otherwise retained and supported thereon in the assembly of the cartridge 10.

More particularly, the material, which may also be a blend, alloy, mixture, copolymer, or other combination of two or more materials, may be a styrenic mid-block (A-B-A) copolymer, with the mid-block being a saturated elastomer, e.g., styrene-ethylene/butylene-styrene (SEBS) or styrene-ethylene/propylene-styrene (SEPS), or an unsaturated elastomer, e.g., styrene-butadiene-styrene (SBS) or styrene-isoprene-styrene (SIS). A particularly preferred material is a linear mid-bock SEBS copolymer (30 wt % styrene) which is marketed under the name Kraton® G1652 by Kraton Polymers, Houston, Tex. Such materials are believed to form a physically cross-linked network by the association of the domain of the styrenic end blocks within which network the absorbed oil may be trapped and held by the material. The material alternatively may be an oil-adsorbing polymer or copolymer such as polypropylene or other polyolefin.

As mentioned, additional components may be included in the formulation of the material depending upon the requirements of the particular application envisioned. Such components, which may be broadly classified as binders, fillers, and other additives, may be functional or inert, may include wetting agents or surfactants, pigments, dispersants, dyes, and other colorants, opacifying agents, foaming or antifoaming agents, anti-static agents, coupling agents such as titanates, chain extending oils, tackifiers, flow modifiers, pigments, lubricants such as molybdenum disulfide ($MOS_2$), silanes, peroxides, film-reinforcing polymers and other agents, stabilizers, emulsifiers, antioxidants, thickeners, and/or flame retardants and other fillers such as aluminum trihydrate, antimony trioxide, metal oxides and salts, intercalated graphite particles, phosphate esters, decabromodiphenyl oxide, borates, phosphates, halogenated compounds, glass, silica, which may be fumed or crystalline, silicates, mica, ceramics, glass or polymeric microspheres, and, particularly, activated carbon. Typically, these additional component are blended or otherwise admixed with the material, and may comprise between about 0.05-80% or more by total weight or volume of the formulation. When consolidated, the material generally may form a matrix, network, continuous phase, network, or other binder, or binder-like form within which the additional components, if any, may be dispersed as a discrete phase, such as in the case of a filler, or with which the component may form an interpenetrating network or other co-continuous phase, such as in the case of a binder.

The optional second 18 stage adjoins the first stage 16, and in the illustrated embodiment 10 of FIG. 1, radially surrounds the first stage. It will be appreciated, however, that, depending for example upon the application and/or the filter type, the second stage 18 may otherwise adjoin the first stage 16, such as by way of being disposed intermediate the first stage 16 and the core 14 so as to be radially surrounded by the first stage, or such as being disposed in a layer which may be above, below, side-by-side, or otherwise next to layer of the first stage 16.

In the illustrated embodiment 10 of FIG. 1, the second stage 18 is provided as a second medium which may comprise a loose, packed, or other fill of an oleophilic polymeric material which may be chemically, i.e., compositionally, the same or different as the material of the first stage 16. Such fill may be contained as shown in the annular region defined between the first stage 16 and the wall of the outer covering 20. Alternatively, the second medium may be provided as a woven or nonwoven, e.g., wound, spunbonded, or melt-blown, rolled, or otherwise formed fiber body.

In fill form, the material of the second medium may be of any shape, or combination of shapes, and is referred broadly herein as being "particulate," which should be understood to include solid or hollow spheres and microspheres, elastomeric balloons, flakes, shreds, platelets, fibers, rods, irregularly-shaped particles, granules, crumbs, fibers, which may be chopped or milled or whiskers, and powders. For many applications, the particle size or distribution of the filler, which may be a diameter, imputed diameter, length, or other dimension of the particulate typically will range from about 300 micrometers to about 3 mm for granules, and from about 1.5 denier to 20 denier and about 3 mm to 40 mm in length for fibers.

As mentioned, the material of the second medium may be chemically the same or different as the material of the first medium. Suitable materials therefore include, as before, oleophilic polymeric materials which may be oil-absorbing and/or oil-adsorbing, and which may be a blend, alloy, mixture, copolymer, or other combination of one or more oil-absorbing materials, one or more oil-adsorbing materials, one or more oil-adsorbing materials and one or more oil-absorbing materials, and any of the same with one or more other components, such as binders, fillers, or additives which may be active or inactive. Representative materials include, again, styrenic copolymer such as SEBS, SEPS, SBS, and SIS, as well as polyolefins such as, especially, polypropylene. The aforementioned additional components also may be included in the formulation of the material, and as either compounded with the material during its processing into a particulate form, or as dry blended or otherwise admixed with the material after its processing into a particulate form. When included during processing, the material generally may form a matrix, network, continuous phase, network, or other binder, or binder-like form within which the additional components, if any, may be dispersed as a discrete phase, such as in the case of a filler, or with which the component may form an interpenetrating network or other co-continuous phase, such as in the case of a binder.

The covering 20 radially surrounds the second stage 18 and, in the case of the medium thereof being provided as a loose, packed, or other fill material, retains such material within the filter 10. Similar to core 14, the covering 20 may be formed of a non-woven polymeric sheet, woven polymeric sheet, perforate plastic, composite, or metal tube or cylinder for the radial flow of the bilge water or other fluid therethrough and into or, as the case may be, out of the filter 10. Alternatively, the covering 20 may be a perforate, porous, or otherwise permeable basket, bag, screen, or the like which is formed of a fiber material which may be a woven, non-woven, e.g., needled, knitted, or wound fabric, felt, cloth, mesh, web, or mat the covering 20 may also be a combination of two or more of the aforementioned components.

As mentioned, in the illustrated embodiment, cartridge 10 is configured to be received within a canister or other housing of a filter for installation within, for example, a line of a bilge water treatment system or other system. In this regard, reference may be had to FIG. 2 wherein such an arrangement is shown generally at 50. As may be seen filter 50 may be similar the styles shown, for example, in U.S. Pat. Nos. 5,445,734; 5,919,362; and 6,056,881, as having canister-type housing or vessel including a generally cylindrical body, 52, having a closed end, 54, and an open end, 56, which is configured for a threaded or other removable or permanent connection to a head mounting, 58. Head mounting 58 may have ports 60 and 62, each of which may function as either an inlet or outlet depending upon the direction of fluid flow which, in the arrangement shown, has port 60 as the inlet port and port 62 as the outlet port. As interposed, for example, between a pair of end caps, 64a-b, cartridge 10 may be received within the housing body 52, which, in turn, then may be sealed by the head mounting 58. So assembled, the filter 50 may be installed within the line of a bilge water treatment system such as between the bilge pump or auxiliary pump and discharge outlet, and further in the manner described is U.S. Pat. No. 6,056,881.

In service, oil-contaminated bilge water, represented by the arrows commonly designated at 70, may enter filter 10 under pressure from the bilge pump or auxiliary pump through port 60 via an attached hose or other line (not shown). Thereupon, flow through the cartridge 10 may proceed, in the direction represented by arrows commonly designated at 72, radially through the medium of the second stage 18 and then through the first stage 16 and the core 14, and into the passageway 22, with the stage 18 sorbing at least portion of the oil from the contaminated water, and the stage 16 sorbing at least a portion of any oil remaining in the flow. From the passageway 22, the now treated, i.e., decontaminated, water, represented by the arrows commonly designated at 74, may flow out of the filter 50 though the outlet port 62, whereupon the water may be discharged via a hose or other line (again not shown) attached to the port 62. It should be appreciated that, with the stages of the cartridge 10 being reversed such that the first medium 16 radially surrounds the second medium 18, the filter 50 may be operated with the flow therethrough being reversed with contaminated water entering via port 62 and passageway 22, with flow proceeding through, respectively, the stages 18 and 16, and with the treated water being discharged via port 60.

Advantageously, and in whatever the manner of operation, the provision of the consolidated medium of the first stage 16, particularly in conjunction with the fill medium of the second stage 18, has been observed to effect a filter element which exhibits superior performance and service life. In this regard, the fixed, anti-channeling and anti-settling material of the first stage medium may function not only as a final sorptive treatment, but also as a flow distributor and/or restrictor, such as in providing a back pressure, which may assist in reducing the potential for settling and/or flow channeling or other bypass of the fill within the second stage, and thereby in ensuring that the full depth of the second stage is utilized for optimal efficiency. Moreover, the effective use of the fill medium of the second stage reduces the concentration of the hydrocarbon contaminates reaching to the first stage, to thereby prolong its service life.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. An oil-sorbing filter element comprising:
   a first stage, the first stage being formed of a first medium comprising a unitary, permeable mass of a first oleophilic polymeric material; and
   a second stage adjoining the first stage;
   the second stage is formed of a second medium comprising a fill of separate particles of a second oleophilic polymeric material;
   wherein the first and second oleophilic polymeric materials are a thermoplastic elastomer.

2. The filter element of claim 1 wherein the consolidated mass of the first medium has a density of between about 0.2-0.8 g/cm$^3$.

3. The filter element of claim 1 wherein the thermoplastic elastomer of first oleophilic polymeric material is a styrenic mid-block copolymer.

4. The filter element of claim 3 wherein the styrenic mid-block copolymer of the first oleophilic polymeric material is selected from the group consisting of styrene-ethylene/butylene-styrene (SEBS), styrene-ethylene/propylene-styrene (SEPS), styrene-butadiene-styrene (SBS), styrene-isoprene-styrene (SIS), and combinations thereof.

5. The filter element of claim 1 wherein the first oleophilic polymeric material is a copolymer of styrene and one or more of pentadiene, cyclopentadiene, butadiene, butylene, propylene, ethylene, and isoprene.

6. The filter element of claim 1 wherein the first medium further comprises an oil-sorbing filler dispersed in the consolidated mass of the first oleophilic polymeric material.

7. The filter element of claim 6 wherein the filler is an activated carbon.

8. The filter element of claim 1 wherein the first stage is formed into a generally cylindrical shape.

9. The filter element of claim 8 wherein the cylindrical shape of the first stage is generally annular.

10. The filter element of claim 1 wherein the thermoplastic elastomer of second oleophilic polymeric material is a styrenic mid-block copolymer.

11. The filter element of claim 10 wherein the styrenic mid-block copolymer of the second oleophilic polymeric material is selected from the group consisting of styrene-ethylene/butylene-styrene (SEBS), styrene-ethylene/propylene-styrene (SEPS), styrene-butadiene-styrene (SBS), styrene-isoprene-styrene (SIS), and combinations thereof.

12. The filter element of claim 1 wherein the second oleophilic polymeric material is a copolymer of styrene and one or more of pentadiene, cyclopentadiene, butadiene, butylene, propylene, ethylene, and isoprene.

13. The filter element of claim 1 wherein the second medium further comprises an oil-sorbing filler dispersed in the consolidated mass of the first oleophilic polymeric material.

14. The filter element of claim 13 wherein the filler is an activated carbon.

15. The filter element of claim 1 wherein:
   the first stage is formed into a generally cylindrical shape; and
   the fill of the second stage radially surrounds the consolidated mass of the first stage.

* * * * *